March 15, 1960 — C. VAN DER LELY ET AL — 2,928,226
RAKING DEVICE CONNECTED WITH A TRACTOR
Filed Nov. 5, 1956 — 3 Sheets-Sheet 2

INVENTORS
CORNELIS VAN DER LELY
ARY VAN DER LELY ated Mar. 15, 1960

2,928,226

RAKING DEVICE CONNECTED WITH A TRACTOR

Cornelis van der Lely and Ary van der Lely, Maasland, Netherlands, assignors to C. van der Lely N.V.

Application November 5, 1956, Serial No. 620,383

Claims priority, application Netherlands December 5, 1955

4 Claims. (Cl. 56—377)

This invention relates to devices for the lateral displacement of hay and the like, and of the type provided with a row of overlapping rake wheels, the rake wheels being connected to a frame beam coupled to a connecting rod which is immovably connected to a tractive device.

Such devices are well known; however, they have the disadvantage that they can only work a strip of land having a fixed position with regard to the longitudinal axis of the tractive device.

An object of the invention is to avoid this drawback and, according to the invention, the frame beam is pivotally connected to the tractive device for pivotal motion about a vertical axis located near the row of rake wheels, locking means for blocking this pivotal motion being provided. An advantage of this construction is that the strip of land worked by the device can be changed or controlled.

Further, it is an advantage of the invention that a vertical hinge axle is provided near the running wheels of the tractive device so that it is possible to work strips having different positions with regard to the associated tractive device without its being necessary to alter the working width of the device.

The device according to the invention can be used, for example, as a side delivery rake or as a tedder.

The invention will be hereinafter more fully explained with reference to the accompanying drawings in which some preferred embodiments have been shown by way of example and in which.

Figure 1:
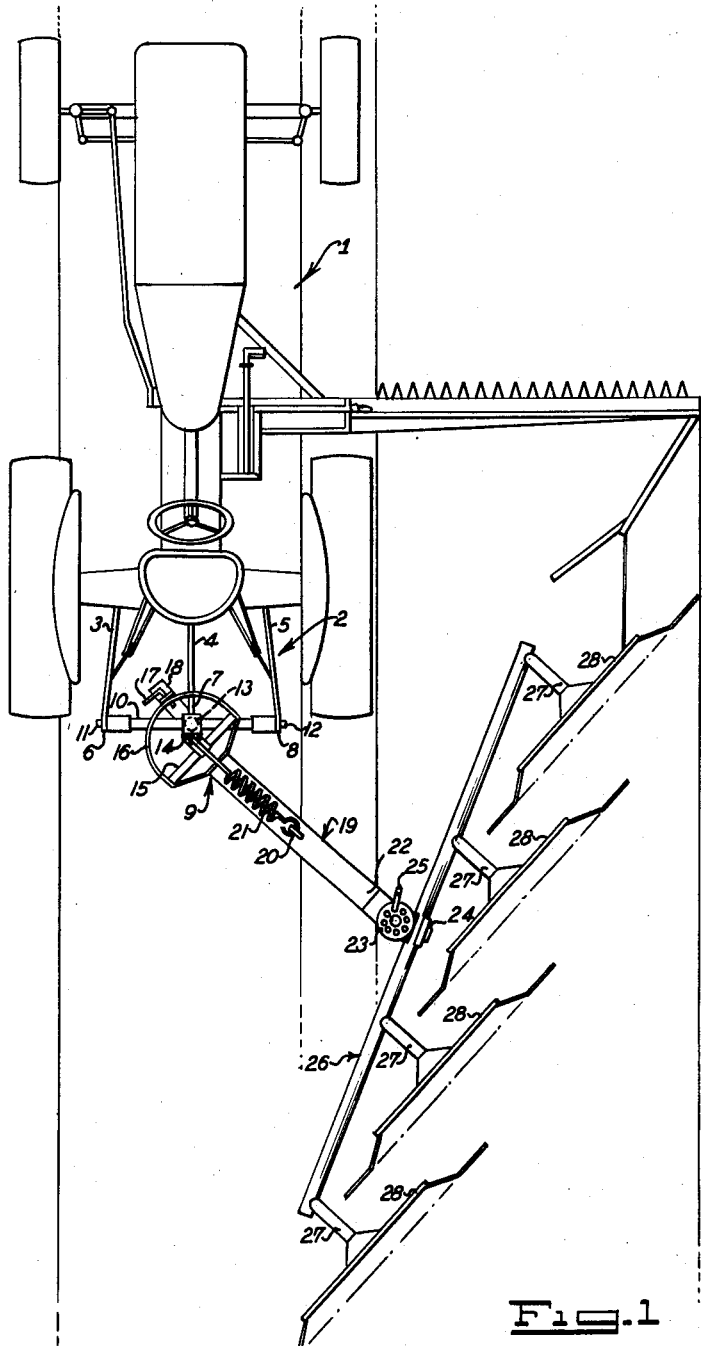
Fig. 1 is a plan view of a preferred embodiment of the invention in which the device operating as a side delivery rake, works a strip of land located beside the tractor and behind a mowing beam which is connected to the tractor.
Figure 2:
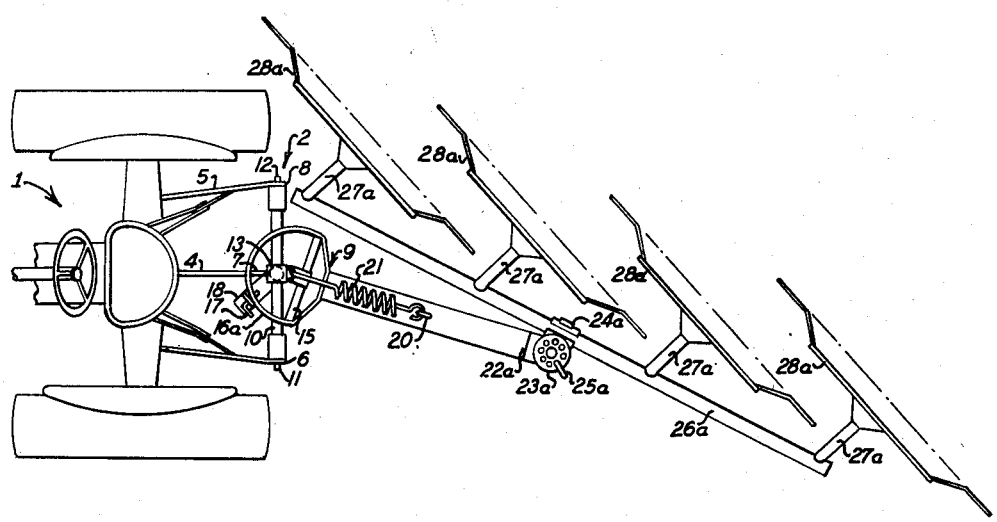
Fig. 2 is a plan view of the device of Fig. 1, but in a position in which a strip of land is worked behind the tractor.
Figure 3:
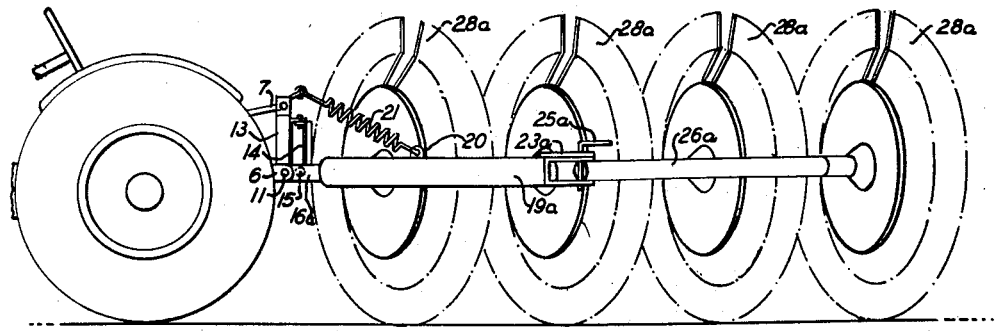
Fig. 3 is a side elevation of the device according to Fig. 2.

According to the embodiment shown in Figs. 1 to 3, a wheeled ground traversing device or tractor 1 is provided with a lifting device 2, comprising three arms 3, 4 and 5, the rear extremities 6, 7 and 8 of which are connected to a coupling device 9 of a side delivery rake. Said coupling device 9 comprises a horizontal beam 10 having two studs 11 and 12 defining axes of rotation, which are pivotally connected to the rear extremities 6 and 8 of the arms 3 and 5.

To the beam 10, a vertical beam 13 (Fig. 3) is connected, the beam being mounted on the rear extremity 7 of the higher arm 4. The vertical beam 13 supports a vertical hinge means or axle 14 (Fig. 3) about which a horizontal bar 15 (Fig. 1) is rotatable. Said bar 15 carries a bow 16 having a number of apertures through which a locking pin 17 can be inserted. Locking pin 17 is supported on the vertical beam 13 by means of a fixed bar 18. By means of said pin 17, the position of the bar 15 relative to the vertical hinge axle 14 can be fixed.

A connecting rod 19 is pivotally connected to the extremities of the bar 15. Between the rear extremity 7 and the portion 20 of the beam 19, a spring 21 (Fig. 3) is mounted. To the extremity 22 of said beam 19, a vertical hinge means or axle 23 is attached about which a horizontal axle 24 is rotatable. A locking device 25 is provided by which the axle 24 can be locked in position with the hinge means or axle 23.

A frame beam 26 is rotatable on the horizontal axle 24, to which beam 26 four axles 27 are attached, four rotatable rake wheels 28 being mounted on axles 27 and overlapping one another. The horizontal axle 24 extends through the center of gravity of the frame beam 26. As a result of the rotatability of the beam 26 about the horizontal axis 24 the rake wheels can adapt themselves to the ground and the pressure of all rake wheels upon the ground is substantially equal. When rotated through an angle of 180° on the axle 24, the rake wheels of the side delivery rake are brought to the tedding position.

The side delivery rake co-operates with a mowing beam. The crop mown by the mowing beam is immediately and laterally displaced by the side delivery rake. The crop worked in this manner dries more quickly. Due to the special position of the vertical axle 23, the positioning of the foremost rake wheel can be changed. With a longer mowing beam the foremost rake wheel must be able to work further toward the outside of the tractor. A turning about the vertical axle 23 brings the foremost rake wheel to desired position relative to the tractor. Consequently, the working width of the side delivery rake is automatically increased.

In Figs. 2 and 3, parts corresponding with the parts of Fig. 1 have the same reference numerals. To the corresponding parts assuming a different position, an "a" is added.

The beam 19 is adjusted about the hinge axle 14 to position 19a, and the frame beam 26 is adjusted about the hinge axle 23 to position 26a.

In this arrangement, the side delivery rake works entirely behind the tractor. The row being laterally displaced by the rake wheels is narrow enough to pass between the running wheels of the tractor.

Figure 4:
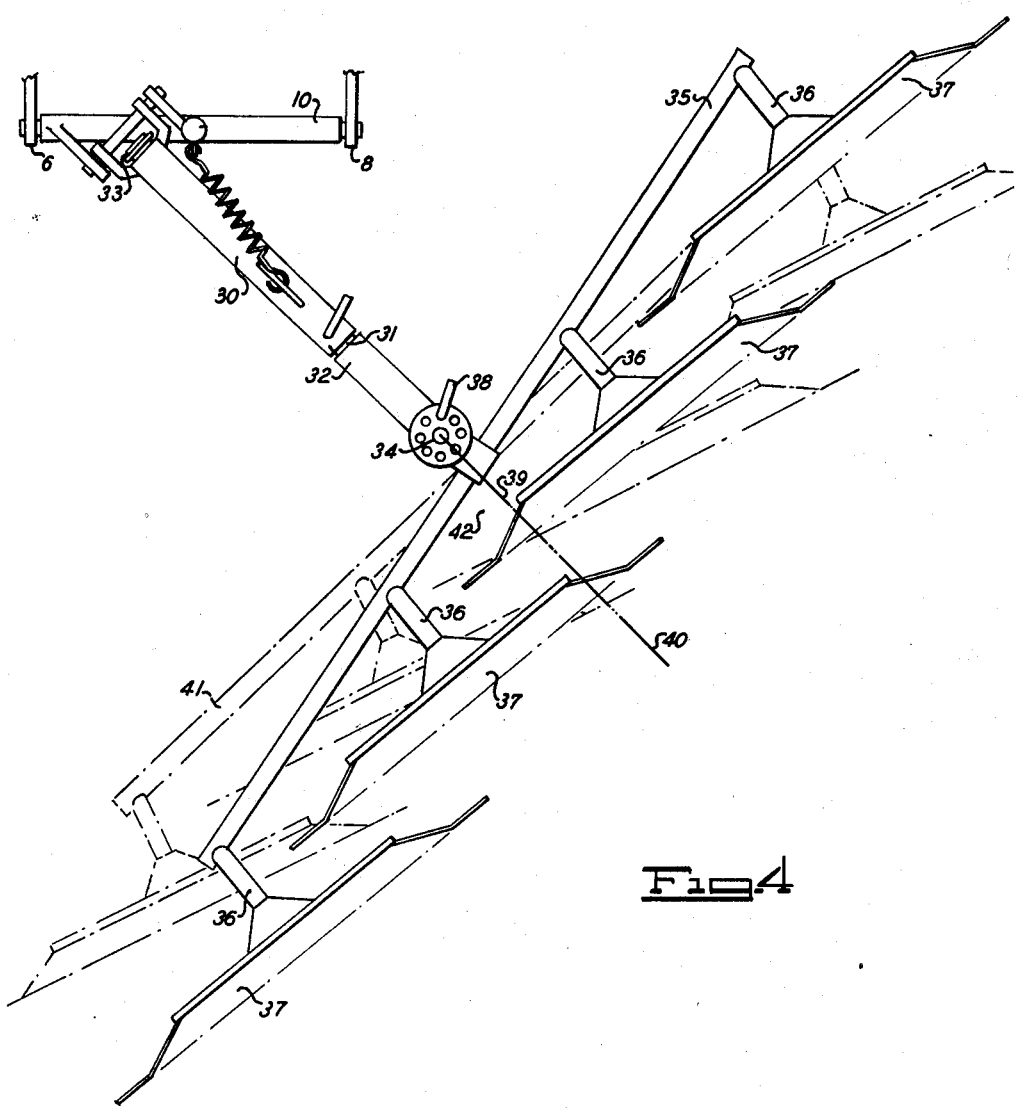
Fig. 4 is an enlarged plan view of a rake connected to a tractor and wherein a row of rake wheels is rotatable about both a vertical and a horizontal axis.

According to Fig. 4, it is possible to adjust the frame beam 19 by means of the tube 30 in which an axle 31 is rotatably mounted. To one end of the axle 31, a beam 32 is connected. The axle 31 is locked against an axial movement by the beam 32 as well as by a ring 33 which is mounted on the foremost extremity of the axle 31.

To the rear extremity of the beam 32, a vertical axle 34 is connected, to which axle a beam 35 is hingedly connected. To the beam 35, four axles 36 are attached, on which four rake wheels 37 are rotatably mounted. The rotatability of the beam 35 about the axle 34 can be locked by a locking-pin 38.

In normal working condition, the center of gravity of the row of rake wheels 37 is situated at point 39 on the center line 40 of the tube 30. Thus, the row of rake wheels has a position of equilibrium with regard to the axle 31, which can freely rotate in the tube 30. The pressure of all of the rake wheels on the ground is thus equal.

However, by rotating the beam 35 with the rake wheels 37 about the axle 34, it is possible to displace the center of gravity of the row of rake wheels from the center line 40. For example, the working width of the row of rake wheels can be increased by an adjustment in which the beam 35 from the position as shown in Fig. 4 is rotated clockwise through a small angle about the axle 34; the resulting position of thte beam 35 is shown in Fig. 4 by the dotted lines 41. In this new position, the center of gravity is at point 42 spaced from the center line 40, due to which the rearmost rake wheels have a greater pressure on the ground. This can be very useful in different circumstances, e.g. if the force exerted over the hindmost rake wheels by raking heavy crops is considerable.

In the above mentioned embodiments, the devices are not provided with running wheels and the weight of the device is substantially supported by the rake wheels.

If the device must be transported, it may be desirable to provide means by which the row of rake wheels and the beam may be lifted from the ground so that the device is only supported by the running wheels of the tractive device.

What is claimed is:

1. A device operative with a wheeled ground traversing vehicle for the lateral displacement of hay and the like comprising a row of overlapping rake wheels; a frame beam supporting said rake wheels; a connecting rod by which the frame beam is restricted to a horizontal plane and which rod is inmovably connected to the vehicle; hinge means defining a vertical axis of movement and coupled between the frame beam and the connecting rod near the center of gravity of the beam and rake wheels; locking means on the connecting rod for blocking movement of the beam relative to the vertical axis during operation of the device; and lift means connected to the connecting rod for displacing the frame beam and the row of rake wheels in a vertical direction so that the device is exclusively supported by the wheels of the vehicle.

2. A device operative with a ground traversing vehicle for the lateral displacement of hay and the like comprising a row of overlapping rake wheels; a frame beam supporting said rake wheels; a connecting rod by which the frame beam is restricted to a horizontal plane and which rod is inmovably connected to the vehicle, first hinge means defining a vertical axis of movement and coupled between the frame beam and the connecting rod near the center of gravity of the rake wheels, but spaced from the combined center of gravity of the frame beam and the row of rake wheels; locking means on the connecting rod for blocking movement of the beam relative to the vertical axis during operation of the device; and second hinge means between said connecting rod and said beam whereby said beam with the row of rake wheels and said first hinge means is rotatable about a horizontal axis.

3. A device as claimed in claim 1 comprising hinge means defining a vertical axis of movement and coupled between the rod and the vehicle near the wheels of said vehicle.

4. A device operative with a ground-traversing wheeled vehicle for the lateral displacement of hay and the like comprising a row of overlapping rake wheels; a frame beam supporting said rake wheels; a connecting rod by which the frame beam is restricted to a horizontal plane and which rod is immovably connected to the vehicle; first hinge means defining a vertical axis of movement and coupled between said connecting rod and the frame beam near the center of gravity of the frame beam and the rake wheels; second hinge means defining a vertical axis of movement and coupled between the rod and the vehicle near the wheels of the vehicle; and third hinge means coupled to the beam whereby the same is rotatable about a horizontal axis, the displacement of the first hinge means causing a displacement of the frame beam and said third hinge means.

References Cited in the file of this patent

UNITED STATES PATENTS

| 2,639,574 | Richey | May 26, 1953 |

FOREIGN PATENTS

| 1,094,584 | France | Dec. 8, 1954 |
| 1,095,043 | France | Dec. 15, 1954 |
| 1,108,945 | France | Sept. 14, 1955 |